Sept. 4, 1951 A. KOVALOVSKY ET AL 2,566,803
BRAKE FOR FISHING REELS
Filed May 12, 1947

INVENTORS
ARTHUR KOVALOVSKY
BY OSCAR KOVALOVSKY
Luther Mack
Attorney

Patented Sept. 4, 1951

2,566,803

UNITED STATES PATENT OFFICE 2,566,803

BRAKE FOR FISHING REELS

Arthur Kovalovsky and Oscar Kovalovsky, Los Angeles, Calif.

Application May 12, 1947, Serial No. 747,415

3 Claims. (Cl. 242—84.7)

This invention relates in general to fishing reels but more particularly to and has for an object the provision of an improved type of brake mechanism by means of which the paying out of a line from the reel may be suitably retarded in accordance with different requirements of fishing practice.

An object is to provide and equip a fishing reel with a convenient, inexpensive and yet efficient brake embodying a minimum of parts which may readily be attached to conventional reel structure and which by reason of an extraordinarily single and simple adjustment will serve to keep the line taut at all times pursuant to the snagging of a fish.

Other and more detailed objects will appear hereinafter as our invention is disclosed.

In the drawing accompanying this specification there is shown a more or less conventional type of reel and mounting and our improved brake mechanism operatively applied thereto.

Figure 1:
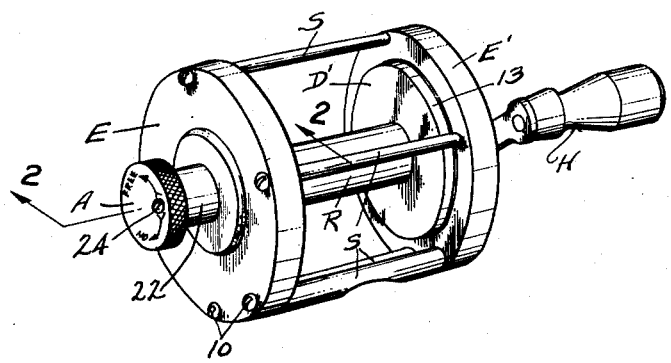
Fig. 1 is a perspective view of a fishing reel embodying our improvements.

A conventional fishing reel R usually embodies spaced ends E and E$^1$ spaced apart by spacers S, S, etc., which are connected at their extremities to ends E and E$^1$ as by screws 10. Reel R includes a spool rotatably carried on ends E and E$^1$ on a shaft 11 and in bearings 12. A handle H is geared to shaft 11 of reel R for rotating the shaft as the handle is turned.

Drums D and D$^1$ are provided at the ends of the reel and serve as flanges for the reel. Said drums or flanges have rims 13 which extend endwardly through central recesses 14 in the inner webs 15 of the ends E and E$^1$. One of the flanges, as at D, we employ as a drum adapted to be engaged by a pair of brake shoes, B and B$^1$, which are pivotally mounted on a disc C at points 16 and 16$^1$, respectively, so that their eccentrically formed and similar outer edges 17 may frictionally engage the inner surface 18 of rim 13, or be disengaged from said rim, selectively, in a fishing operation. Said disc C is fixed to shaft 11 for rotation with the handle H.

Shoes B and B$^1$ are normally urged out of engagement with rim 13 by springs 19 which are seated in bores 20 in disc C while their opposite extremities bear against the heel portions 21 of shoes B and B$^1$, thereby tending to hold the shoes disengaged from drum D.

Ends E and E$^1$ carry frictionless bearings F which rotatably receive hubs 22 of discs C. The hub of said disc, as at 22 is internally threaded to adjustably receive a stem 23 of an adjuster A which is exteriorly mounted on end piece E, as in Fig. 2. Said adjuster is coaxial with spool R and is both rotatable with and independently of the spool, the extent to which it may be independently rotatable being limited by a stop screw or pin 24 carried by the adjuster and a similar device 25 carried by hub 22 of disc C.

Disc C is a pair of diametrically disposed pins 26, 26, arranged tandem fashion in a diametrical bore 27, the inner abutting ends of which are spheroidal while their outer ends engage the inner edges 28 of shoes B and B$^1$, so as to provide wedge-like adjacent terminal portions.

Figure 2:
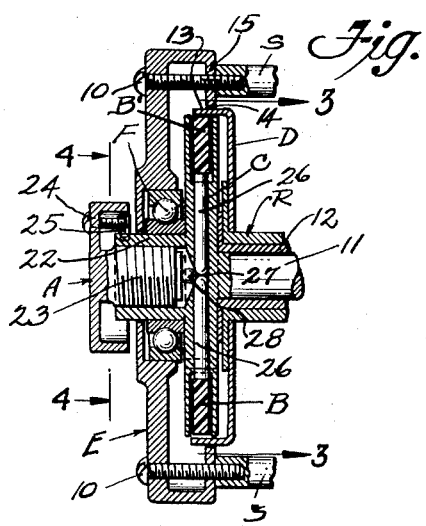
Fig. 2 is an axial cross section of the same on line 2—2 of Fig. 1.
Figure 3:
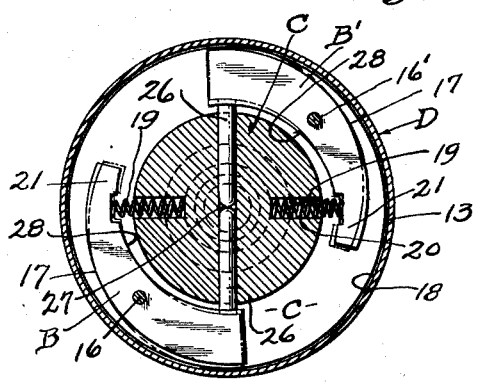
Fig. 3 is a section in the plane of line 3—3 of Fig. 2.
Figure 4:
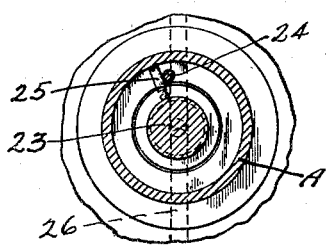
Fig. 4 is a section on line 4—4 of Fig. 2.

As shown in Fig. 2, the bottom of the threaded bore of hub 22 into which the adjuster stem 23 is extended is conically formed and carries a ball 28 at an axial point where pins 26, 26 abut and adapted to commonly engage said pins, wedge-like for spreading the pins apart. Thus, as adjuster A is rotated and thereby extended inwardly into hub 22 the ball 28 is forced between pins 26, 26, said pins are radially urged against shoes B and B$^1$ and said shoes, in turn, are urged into braking engagement with rim 13. In such manner spool R is correspondingly retarded, or as the adjuster is moved in a reverse direction, the spool is freed for rotation. Disc C being fixed to shaft 11 and said shaft being subject to a back stop (not shown) at its opposite end, the disc is held stationary while the spool is paying out a line under the influence of the brake.

It is well known that in fishing reels the shaft 11 is fixed to handle H while spool R is adapted to rotate either with or on said shaft. Said shaft freely rotates in one direction for taking up slack in a line when the spool is clutched to the shaft as by means of the shoes B and B$^1$, or otherwise, but is prevented from rotation in a reverse direction by the usual back-stop when the spool is stationary or is rotating in a reverse direction for paying out the line under tension as when shoes B and B$^1$ are engaged with drum D under the influence of the adjuster A. Hence, the frictional contact of the shoes regulates the retardation of the spool in a pay-out operation to an extent desired by a fisherman under different conditions by reason of the adjustment of adjuster A.

We claim:

1. A fishing reel comprising: a frame, a crank operated shaft rotatable on the frame, a spool rotatable on the shaft, a brake supporting member at all times rotatable with the shaft, shoes pivotally mounted on the brake supporting member for frictional engagement with a flange of the spool, radially separable and extensible members normally having their inner adjacent ends abutting and their outer ends engaging the inner edges of said shoes while the brake is inoperative, the inner ends of said extensible members being spheroidally formed, an adjuster carried by the brake supporting member, and a spherical element confined between the adjuster and adjacent ends of the said radially extensible members for urging the latter outwardly to spool braking position when the adjuster is operated.

2. A fishing reel as characterized in claim 1 including springs carried by the brake supporting member which are extensible for urging the brake shoes to normally inoperative position and are compressible when the shoes are adjusted to operative position.

3. A fishing reel brake comprising: a frame, a disc rotatable thereon, a spool at times rotatable with and at other times independently of the disc, said spool including a drum, an adjuster extensibly held in a recess of the disc, radially extensible pins carried by the disc and provided with spheroidal inner ends, a sphere carried in the adjuster recess of the disc and adapted to commonly engage the inner end of the said pins when the adjuster is extended to a maximum limit into its recess so as to extend said radially disposed pins outwardly, and brake shoes pivotally held on the disc engageable at points with said pins and at other points with the drum for retarding the rotation of the spool relative to that of the disc.

ARTHUR KOVALOVSKY.
OSCAR KOVALOVSKY.

REFERENCES CITED

The following references are of record in the file of this patent:

UNITED STATES PATENTS

| Number | Name | Date |
|---|---|---|
| 93,798 | Bigelow | Aug. 17, 1869 |
| 316,259 | Grater | Apr. 21, 1885 |
| 1,890,736 | Lenz | Dec. 13, 1932 |
| 2,120,069 | Griswold | June 7, 1938 |
| 2,162,726 | King | June 20, 1939 |